United States Patent
Bouet

(10) Patent No.: US 7,640,350 B2
(45) Date of Patent: Dec. 29, 2009

(54) TRANSFERRING OBJECTS WITHIN AN ONGOING FILE TRANSFER OPERATION

(75) Inventor: Stephane Bouet, Tokyo-To (JP)

(73) Assignee: Nokia Corporation, Espoo (FI)

( * ) Notice: Subject to any disclaimer, the term of this patent is extended or adjusted under 35 U.S.C. 154(b) by 522 days.

(21) Appl. No.: 10/027,302

(22) Filed: Dec. 20, 2001

(65) Prior Publication Data

US 2002/0141405 A1 Oct. 3, 2002

(30) Foreign Application Priority Data

Dec. 22, 2000 (FI) ................................. 20002852

(51) Int. Cl.
*G06F 15/16* (2006.01)
(52) U.S. Cl. ................. 709/230; 709/218; 348/564; 345/619; 345/638; 455/566
(58) Field of Classification Search ................. 709/230
See application file for complete search history.

(56) References Cited

U.S. PATENT DOCUMENTS

| | | | |
|---|---|---|---|
| 5,959,687 A * | 9/1999 | Dinwiddie et al. | 348/564 |
| 5,999,160 A * | 12/1999 | Kitamura et al. | 715/202 |
| 6,560,639 B1 * | 5/2003 | Dan et al. | 709/218 |
| 6,570,585 B1 * | 5/2003 | Hines et al. | 715/716 |
| 6,600,902 B1 * | 7/2003 | Bell | 455/41.2 |
| 6,684,087 B1 * | 1/2004 | Yu et al. | 455/566 |

FOREIGN PATENT DOCUMENTS

| | | |
|---|---|---|
| EP | 0594199 A1 | 4/1994 |
| EP | 0980168 A2 | 2/2000 |

OTHER PUBLICATIONS

"Dali: MPEG Video—C API" Nov. 14, 1998, from http://www.cs.cornell.edu/dali/api/mpegvideo-c.html.*

* cited by examiner

*Primary Examiner*—Yves Dalencourt
(74) *Attorney, Agent, or Firm*—Locke Lord Bissell & Liddell

(57) ABSTRACT

The invention discloses a method of sending pictures for display individually or as a series of pictures in a mini-clip on a receiving device during a lengthy file transfer. The invention, although not strictly limited to, is particularly suitable for use in a Bluetooth environment using the Object Exchange (OBEX) protocol. In an embodiment of the invention, a picture or series of pictures (710,720,730) are encapsulated within a Application Parameters header of the ongoing long file transfer. When picture data is too large to fit into a single header the data may be segmented and spanned over several headers. The headers contain parameters that define display characteristics such as picture display time and mini-clip or series refresh rate, thereby lending the method particularly well for the display of advertising content.

32 Claims, 5 Drawing Sheets

| Byte 0 | Bytes 1, 2 | Bytes 3 to n |
|---|---|---|
| Opcode for 'PUT' | Packet length | Sequences of headers |

Figure 1

| Header Identifier | Header Length | Header content |
|---|---|---|
| 0x01 | 0x0014 | TRIAL.TXT |

Figure 2

| Header Identifier | Header Content |
|---|---|
| 0xC3 | Total length of the object to be transferred in the body header |

Figure 3

| Parameter triplet 1 | | | Parameter triplet 2 | | | ... | Parameter triplet n | | |
|---|---|---|---|---|---|---|---|---|---|
| Tag 1 | length | value | Tag 2 | length | value | | Tag n | length | value |

Figure 4

1st picture of a series of 3

2nd picture of a series of 3

3rd picture of a series of 3

TRANSFERRING OBJECTS WITHIN AN ONGOING FILE TRANSFER OPERATION

FIELD OF INVENTION

The present invention relates generally to content delivery to wireless devices and, more particularly, to sending binary objects such as pictures within a non-related file transfer operation.

BACKGROUND OF THE INVENTION

In the information age of today, computing devices have proliferated virtually throughout all levels of modern society. These devices often interact with each other and with computers through networks such as local area networks (LANs) generally by means of wires or cables. Other means of connectivity have been developed, for example, to provide links between PCs and peripherals using infrared connections based on the IrDA protocol developed by the Infrared Data Association. Infrared connections provide interoperable communication between devices through standard IrDA ports that are included in many devices, such as desktop and laptop computers, printers, fax machines, keyboards, joysticks and other digital devices.

Despite the advantages provided by infrared connections, there are some notable limitations to its practical use. For example, infrared connections typically require a relatively short line-of-sight connection and is very directional. Furthermore, infrared beams can not penetrate opaque materials such as walls thereby limiting its use within the same room. The growing prevalence of wireless handheld devices such as mobile phones and PDAs has created a need to provide connectivity by enabling voice and data connections with computers and other digital devices.

One proposed solution that provides the desired connectivity without the limitations imposed by infrared is Bluetooth. Bluetooth is a communications standard for short-range radio connections that allow communication with mobile devices in an ad-hoc fashion. Bluetooth enables voice and data transfer between communication devices and computing devices within a range of about 10 to 100 meters. Since it is based on radio technology, it allows for the elimination of cables that normally connect devices to be replaced by a universal short-range radio link. And due to its RF nature, the devices do not need to be within line-of-sight of each other which allow connections through walls or other non-metal objects. This enables mobile phones to be especially suitable for use with Bluetooth where they could, for example, operate as a modem for a laptop or PDA to further enhance mobility.

Some applications that are suitable for use with Bluetooth include synchronization of calendars, messaging, and phonebooks, file transfer functionality, and object push for business card support, for example. The Bluetooth specification defines the use of the Object Exchange (OBEX) protocol for transferring objects such as files, pictures, calendar entries (vCalendar) and business cards (vCard). OBEX is a session protocol that was originally specified by the IrDA (Infrared Data Association) for transporting objects over infrared connections. For a more complete description of the OBEX protocol the interested reader may refer to "IrDA Object Exchange Protocol IrOBEX", version 1.2, Counterpoint Systems Foundry, Inc., Mar. 18, 1999.

Although OBEX provides an efficient method to transfer a wide variety of data and commands in a resource sensitive and standardized environment, typical OBEX transfers involve transporting one object (file) at a time. By way of example, using a 'PUT' command to initiate a file transfer operation precludes the use of sending other objects that are not part of the ongoing transfer. The 'PUT' command "pushes" content from a content storage of a sending device to a receiving device. However, there are times when it would advantageous to be able to send multiple unrelated objects during the same operation.

Solutions presented in the past to deal with this issue have been intimately linked with a specific protocol. By way of example, some systems use protocols that allow for multiplexing in the form of multiple sessions running in parallel. While others adopt different protocols for different types of content and run those protocols in parallel, which would require more resources and processing power. With respect to using OBEX, the only solution thus far has been to open two separate sessions, by sending a connection request to two separate target IDs, and run them in parallel where each piece of content is handled as one object carried in one session. This technique has the drawback of requiring a relatively complex OBEX implementation which has a negative impact on performance of a low bit rate short range systems such as Bluetooth.

In view of the foregoing, a technique is needed that permits the parallel transfer of multiple objects during an ongoing operation that is compatible with the OBEX protocol and does not require additional resources for a separate session.

SUMMARY OF THE INVENTION

Briefly described and in accordance with an embodiment and related features of the invention, in a method aspect of the invention there is provided a method of transmitting objects during an ongoing packet transfer operation between a sending device and a receiving device, wherein said packet transfer is comprised of a plurality of packets defined in accordance with a transfer protocol, the method comprises the step of transmitting the object with the packets associated with said packet transfer between the sending device and the receiving device.

In a system aspect of the invention there is provided a system for sending a object during a file transfer operation, wherein the object data is embedded in a plurality of packets with said file transfer, the system comprises:

a sending device for sending the object data;

a receiving device for receiving object data from the sending device;

means for embedding said object data in said plurality of packets; and means for displaying said object on said receiving device.

BRIEF DESCRIPTION OF THE DRAWINGS

The invention, together with further objectives and advantages thereof, may best be understood by reference to the following description taken in conjunction with the accompanying drawings in which:

FIG. 1 shows the structure of an OBEX packet;

FIG. 2 illustrates the structure of an exemplary name header;

FIG. 3 illustrates the structure of an exemplary length header;

FIG. 4 shows a configuration of tag-length-value triplets encoded in an AP header;

DETAILED DESCRIPTION OF THE INVENTION

Figure 5:
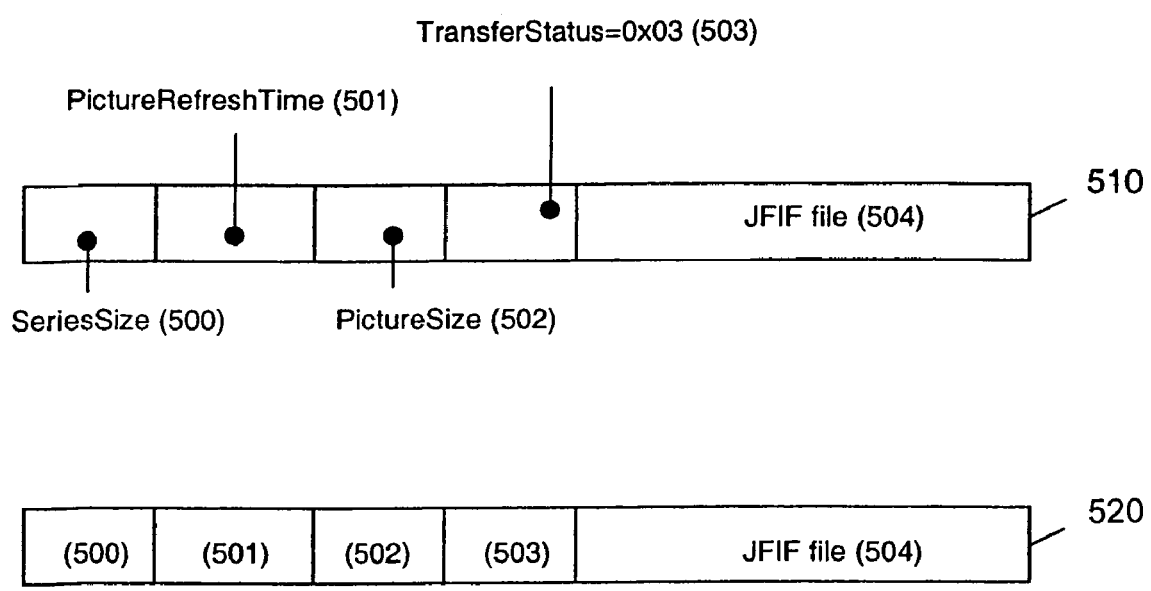
FIG. 5 illustrates an exemplary configuration of triplets for sending a series of two independent pictures, in accordance with an embodiment of the invention.

As discussed in the preceding sections, the present invention discloses a technique to send objects (images) during a download operation using the Object Exchange (OBEX) protocol. Due to the bandwidth constraints in the wireless environment and the limited data rates available for use with short range communications, e.g. Bluetooth technology, downloading times can turn out to be relatively long. The method allows the transfer of multiple pieces of data, which are comparably smaller in size to an ongoing file transfer, in the same operation.

The utility of this is demonstrated in an exemplary scenario where a user may be receiving a relatively large file which could take some time to complete and, in the meantime, the display of the receiving device will typically be blank while the device is occupied with the transfer. This "downtime" presents an opportunity to display graphical images on the receiving device to convey information. The displayed information could include advertisement content for use promoting products which could have the possibility of changing depending on the users location.

which could introduce new revenue models for service providers.

In an embodiment of the invention, the task of having two objects transferred in parallel is placed onto the upper layer i.e. the application that is making use of the OBEX operations. This is in contrast to having the OBEX implementation support parallel sessions. This becomes especially useful in situations where it is advantageous to keep the OBEX implementation to a minimum. Moreover, by mapping an existing image format onto an OBEX header and enriching it with display and timing information, the embodiment eliminates the need for having a separate control channel.

OBEX is a session protocol that was originally specified by the IrDA (Infrared Data Association) for transporting objects over infrared connections. OBEX can be characterized as a binary equivalent to the HTTP protocol thus, because of its binary encoded nature, creates interesting possibilities for transporting binary (or textual) data such as pictures over links with limited bandwidth such as in Bluetooth. The protocol does not specify a top or bottom API thereby making it very flexible in that it can run over transport layers such as TCP/IP, in addition to Bluetooth baseband radio transmission channels.

FIG. 1 illustrates the general structure of an OBEX request packet. Each request packet comprises of an opcode in Byte 0 such as a 'PUT' (send content, opcode 0x02) or 'GET' (retrieve content, opcode 0x03). In bytes 1 and 2 is a packet length in bytes and one or more headers from byte 3 and on. Examples of headers include name of file, length of file, and date which are typically followed by the object body (file data). A header must fit into a single request packet, although segments of data may be split over several packets, provided that, in each packet, the segment of data is preceded by a Body header. Furthermore, sending a large file may require many a 'PUT' packets to complete where the last packet will be signified by having the final bit set in the 'PUT' opcode (i.e. 0x82). The 'PUT' command "pushes" content from a content storage of a sending device to a receiving device whereas a 'GET' command retrieves content from a device.

FIG. 2 illustrates the structure of an exemplary name header that may be sent within an OBEX request packet. For file transfers, the name header has a length of at least 3 bytes (1 byte opcode+2 byte length+variable length name). Although name headers are optional, they are recommended so that the receiving application knows what to do with the subsequent file content. In the example, the header opcode identifier is 0x01 which indicates to the application that this is a name header and a 2 byte length is 0x0014 which gives the length of the following content. The content itself may be a text file, such as TRIAL.TXT as shown, where the receiving device such as a PC or PDA is able to interpret the contents of the name field as a filename.

FIG. 3 illustrates the structure of an exemplary length header. A length header identifier of '0xC3' is used to indicate the total length of the object to be transferred in the body header. The length, if known in advanced, is sent to the receiver before the content so that it may quickly terminate the transfer if it requires more space that it can handle. Moreover, the length information can be used in the calculation of the remaining transfer time for displaying a download indicator on the receiving device. The length header is optional since, in some cases, the length is not known in advance in which case the End-of-Body header is used to indicate when the end of the object is reached.

In accordance with the invention, binary content image files are encapsulated into one or several OBEX Application Parameters headers, depending on the size of the picture data. The Application Parameters header (AP header) is used by applications (and protocols) layered above OBEX to convey additional information in a request or response packet. In a request such as a 'PUT', the AP header conveys request parameters or modifiers. A Tag-Length-Value encoding scheme is used to support a variety of request/response types or levels. An AP header may contain any number of tag-length-value triplets.

FIG. 4 shows a configuration of n number of tag-length-value triplets encoded in an AP header. The tag and length fields are each one byte each and are defined by the applications or upper protocol layer that uses them. The value field can include anywhere from zero to n bytes which contain the content of binary data. The number of triplets n is constrained by the size of the OBEX packet in which the AP is transported. The packet size is itself constrained by the maximum packet size negotiated during the establishment of the connection. In accordance with the invention, a binary image file, such as a JFIF formatted image, is encoded within a tag-length-value triplet of the main file transfer operation. A JFIF formatted image is a binary based format used to define the transmission of the widely used JPEG encoded bitmap data. It should be noted that the invention is not limited to JFIF formatted images but is applicable to other binary based encoded images such as JPG, JPG2000, GIF, PNG, TIF, EXIF, AVI, and MP3.

The invention introduces parameters that are used to control the way the encoded image data is displayed on the receiving device. Individual pictures can be displayed independently or as multiple individual pictures displayed in succession which herein is referred to as a mini-clip series. Moreover, large image files may be segmented and spanned over several AP headers (triplets) of an ongoing file transfer.

FIG. 5 illustrates an exemplary configuration of triplets, in accordance with an embodiment of the invention, for sending a series of two independent pictures in headers 510 and 520 respectively. The content of the triplets include JFIF files, each of which are able to fit into a single header. Field 500 is a three byte tag comprising the SeriesSize parameter. The SeriesSize gives the size of the series that is about to be sent which is the sum of all the pictures in the series. This size is represented by 3 bytes and can take any value from 1 to 16,777,216 bytes. The parameter is also valid if the series only contains one picture. Typical sizes of individual pictures for display on a mobile device display are in the range of around 120×160 pixels (which represents about 3-9 Kbytes after JPG encoding), so for most applications a maximum of 16.7 M bytes is usually sufficient.

Field 501 is a two byte field that indicates the PictureRefreshTime. The PictureRefreshTime determines the length of time in milliseconds the picture will be displayed. In the case as shown where there is only one independent picture, an OBEX parser can quickly determine that the AP header contains only one picture from the presence of PictureRefreshTime immediately following the Series Size parameter 500. Once the time elapses the receiving device could switch to another picture or series of pictures, or leave the last picture displayed or leave a blank screen when no other picture data is available.

Field 502 is a PictureSize [2 bytes] parameter. The PictureSize indicates the total length of the picture data in bytes where its value ranges from 1 to 65,536 bytes. This parameter is useful when the series contains multiple pictures to calculate the remaining picture data from the series size.

Field 503 is a TransferStatus [1 byte] parameter. The TransferStatus indicates whether the current triplet is carrying the last segment of a picture. The TransferStatus values are given by a code Hex where '0x01' indicates "More picture segments to come", '0x02' indicates "End of picture", and '0x03' indicates "End of picture and of series." Field 504 contains the actual JFIF file picture data.

Table 1 shows the tags that have been defined for use in the various tag-length-value triplets which encode to the following parameters:

TABLE 1

| TAG | PARAMETER |
|---|---|
| 0x01 | SeriesSize |
| 0x02 | SeriesRefreshNumber |
| 0x03 | PictureRefreshTime |
| 0x04 | PictureSize |
| 0x05 | TransferStatus |
| 0x06 | Imaging Data |

Figure 6:
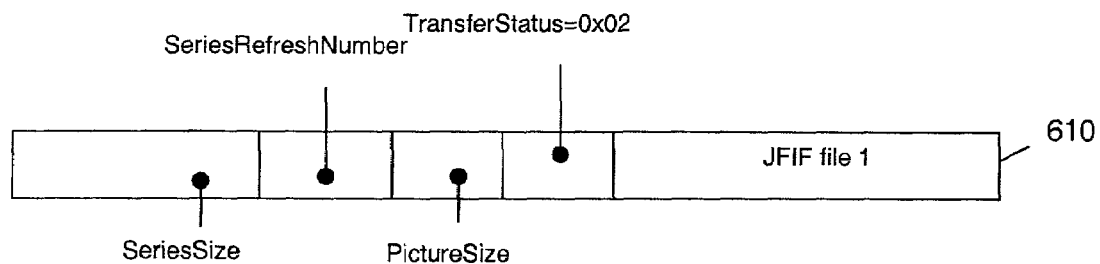
FIG. 6 illustrates an exemplary triplet configuration for sending a series of three pictures that fit into a single header, in accordance with an embodiment of the invention.
Figure 6:
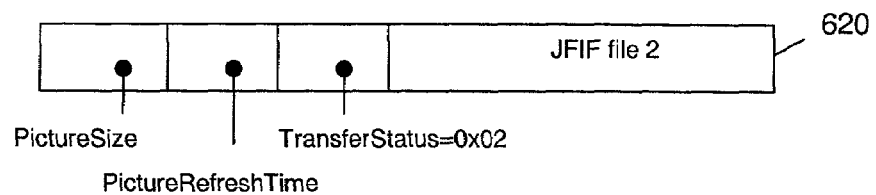
Figure 6:
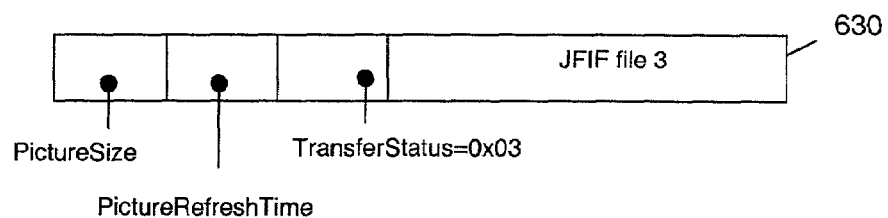

FIG. 6 illustrates an exemplary triplet configuration, in accordance with an embodiment of the invention, for sending a series of three pictures, in which each are small enough to fit into a single header. The series of individual pictures, when displayed in succession, is also referred to as a mini-clip. As shown, parameters sent in the header of the first independent picture includes the SeriesSize [2 bytes], SeriesRefreshNumber [2 bytes], PictureSize [2 bytes], TransferStatus [1 byte], followed by the picture content.

The SeriesSize, as mention earlier, gives the total size of all the pictures in the series whereas the SeriesRefreshNumber indicates the number of times the series containing all the pictures is displayed. After the last display of the series the receiving device could leave the last picture displayed, switch to another series of pictures, or leave the screen blank. The PictureSize indicates the size of the first independent picture of the series. The sum of the PictureSize fields of all the pictures in the series makes up the SeriesSize. The TransferStatus indicates whether the picture is the last picture in the series or if there are more to come. In this case it is not so the TransferStatus field in 610 would contain the value of '0x02'. The fact that the header contains a SeriesSize parameter would indicate to the OBEX parser that the picture is the first one in the series. Following the TransferStatus is the picture data itself (JFIF file 1).

The triplet 620 of the second independent picture in the series comprises the PictureSize that indicates the size of the picture, the PictureRefreshTime that indicates how long the picture is displayed e.g. in milliseconds (typically the first picture would be a title picture in which an advance to the second picture could occur at the terminal's leisure), the TransferStatus ('0x02') that indicates it is not the last in the series, and finally the picture data for JFIF file 2.

The triplet 630 of the third independent picture in the series of three is the same as that for the second independent picture in 620 except that the TransferStatus field contains the value '0x03' to indicate the last picture in the series.

The target device that receives these headers will display the pictures in succession to produce a mini-clip effect similar to the movement effect created by flashing still pictures. Since OBEX requires an underlying reliable transport layer, it can be assumed that the pictures will be received and thus displayed in the correct order, although the first and last picture can always be deduced from the parameters.

Figure 7:
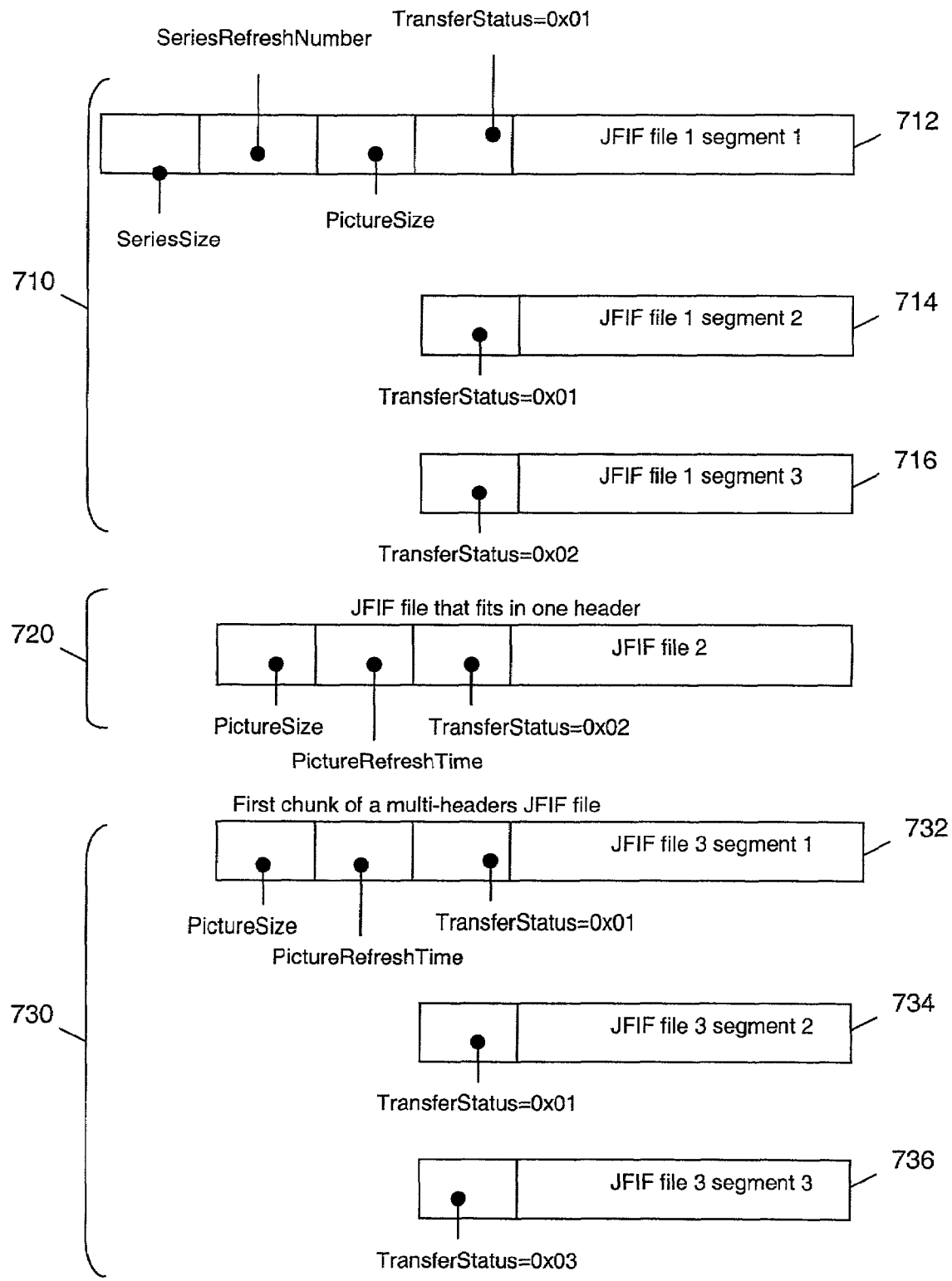
FIG. 7 illustrates a triplet configuration for a three picture series that do not fit into a single header, in accordance with an embodiment of the invention.

FIG. 7 illustrates a triplet configuration, in accordance with an embodiment of the invention, for a three picture series where some of the pictures do not fit into a single header. The data for JFIF file 1 is too large to fit in header 712 and thus is segmented to span over a group of three headers represented by 710. The first picture group 710 comprises header 712, header 714, and header 716. In header 712, the parameter fields comprise the SeriesSize [2 bytes] which gives the total size of the series and where its existence denotes the first picture of the series, the SeriesRefreshNumber [2 bytes] which gives the number of times the series is displayed, the PictureSize j[2 bytes] which gives the size of the picture data for the combined headers, the TransferStatus [1 byte] which containing the value of '0x01' to indicate more pictures are to come. The final field of 712 contains the first segment of JFIF file 1. This means that the picture is larger than the 64K maximum for the header which when spanned over three headers, implies that it is at least larger than 128K. Header 714 includes the TransferStatus value of '0x01' together with the second segment of JFIF file 1. The last header 716 of the group includes the third segment of JFIF file 1 together with a TransferStatus of '0x02' to indicate the last segment of the picture.

The second picture of the series, JFIF file 2, is small enough to fit completely in header 720. Thus, only the PictureSize, PictureRefreshTime, TransferStatus, and picture data are included in the header. The transfer status value of '0x02' indicates that it is the last (and only) picture of the group.

The third picture of the series also spans over a group of three headers represented by 730. A first header 732 comprises parameters that include a PictureSize, PictureRefreshTime, TransferStatus, followed by the first segment of the picture data. The transfer status field contains the value of '0x01' to indicate more picture data is to come. Header 734 includes the second segment of the third picture of the series. Likewise, the transfer status field contains the value '0x01' to signify that it is not the last segment of data. Header 736 includes a transfer status value of '0x03' which signifies the last segment and the end of the series.

It should be noted that there is no limit to the number of headers over which the picture data can span. Thus the technique of spanning over multiple headers allows relatively large pictures to be displayed in mini-clip presentation. The invention also provides a degree of control over which pictures are displayed e.g. the length of time an individual picture is displayed and the frequency that the mini-clip is displayed.

The format put forth by the invention is compatible for encapsulation within the OBEX protocol 'PUT' command for an ongoing file transfer. Thus, during a voluminous content transfer the user can receive embedded pictures having a predetermined display behavior. The lengthy transfer presents an opportunity to display graphical data on the receiving device, which would otherwise be blank. Although there is no explicit limit to the size or number of pictures, as a practical matter the picture content should be at least one order of magnitude smaller than the user content being downloaded so it does not significantly affect the main file transfer. Moreover, the invention, in addition to sending full size pictures, could send icons or small graphics data for superimposition on the current displayed information.

It should be noted that the invention is not limited to use of Bluetooth but is applicable with any system that uses the OBEX protocol for data transfers such as infrared connections, for example. Beyond that, the objects (e.g. pictures) are not limited to the packet headers and can be transmitted in, for example, the data field of a packet transfer.

Furthermore, the transmission of pictures can be included in a packet transfer that includes non binary data by sending the pictures in packets that are combined with the packets of the packet transfer, thereby allowing the use of transport protocols other than OBEX.

Although the invention has been described in some respects with reference to a specified embodiment thereof, variations and modifications will become apparent to those skilled in the art. It is therefore the intention that the following claims not be given a restrictive interpretation but should be viewed to encompass variations and modifications that are derived from the inventive subject matter disclosed.

The invention claimed is:

1. A method, comprising:
transmitting, during an ongoing packet transfer operation in which packets of content are transferred between a sending device and a receiving device, picture data in addition to said content, at least a portion of said picture data for display on a display associated with the receiving device during said ongoing packet transfer, wherein said packet transfer comprises a plurality of packets and at least one of the plurality of packets comprises a payload portion and a separate header portion comprising the at least a portion of said picture data, wherein said picture data is a binary image file having a binary based format used to define transmission of encoded bitmap data;
wherein the header portion includes at least one parameter that controls the display of the at least a portion of said picture data on the display associated with the receiving device during the ongoing packet transfer.

2. A method according to claim 1 wherein in the transmitting step, the at least a portion of the picture data includes at least one picture for transmission to the receiving device.

3. A method according to claim 2 wherein a series of individual pictures are transmitted for display in succession on the receiving device to be viewed as a mini-clip.

4. A method according to claim 2 wherein the picture is sent within a frame of packet headers in a field configuration that includes at least one field selected from the group consisting of a field for specifying the size of the picture series, a field for specifying the length of time the picture is displayed, a field for specifying the size of the picture, and a field for the picture data.

5. A method according to claim 4 wherein a subsequent header for a subsequent picture in the series includes a field for indicating the last picture of the series.

6. A method according to claim 2 wherein a step of spanning the picture in segments is performed over multiple Application Parameters headers when the picture is too large to fit into a single header.

7. A method according to claim 6 wherein the picture segments are sent within a frame of packet headers in a field configuration that includes at least one field from the group consisting of a field for specifying the size of a picture series, a field for specifying the number of times the picture is displayed, a field for specifying the size of the picture, and a field for the picture data.

8. A method according to claim 7 wherein subsequent headers for subsequent picture segments include a field for indicating the last segment of a picture.

9. A method according to claim 1 wherein the packet transfer is transmitted in accordance with the Object Exchange (OBEX) transfer protocol in a short range communication operating environment.

10. A method according to claim 1 wherein the picture data is displayed in lieu of the content during said ongoing packet transfer.

11. A method according to claim 1 wherein the picture data and the content are transmitted wirelessly.

12. The method of claim 1, wherein said at least a portion of the picture data is decoded prior to being displayed on the display associated with the receiving device.

13. The method of claim 1, wherein said picture data is a binary image file having a binary based format used to define transmission of encoded bitmap data drawn from the group consisting of JFIF, JPG, JPG2000, GIF, PNG, TIF, EXIF, AVI, and MP3 formatted images.

14. A system, comprising:
a sending device configured to send during an ongoing file transfer operation in which content is sent from the sending device to a receiving device, picture data in addition to said content, at least a portion of said picture data for display during said ongoing packet transfer, wherein the at least a portion of the picture data is embedded in at least one of a plurality of packets of said ongoing file transfer;
wherein said at least one packet comprises a header portion and a payload portion and said at least a portion of the picture data is in the header portion, wherein said picture data is a binary image file having a binary based format used to define transmission of encoded bitmap data;
a receiving device configured to receive said at least a portion of said picture data from the sending device; and
a display configured to display said at least a portion of said picture data on said receiving device while waiting for said ongoing file transfer to complete;
wherein the header portion includes at least one parameter that controls the display of the at least a portion of said picture data on said display during the ongoing file transfer.

15. A system according to claim 14 wherein the picture data is a picture or series of pictures.

16. A system according to claim 14 wherein the sending device is a wireless device.

17. A system according to claim 14 wherein the receiving device is a wireless device having a graphics capable display.

18. A system according to claim 14 wherein said at least a portion of said picture data and said content are sent wirelessly.

19. An apparatus, comprising:
a sending device configured to transmit, during an ongoing packet transfer operation in which packets of content are sent to a receiving device, image data in addition to said content, at least a portion of said image data for display on a display associated with the receiving device during said ongoing packet transfer, wherein said packet transfer comprises a plurality of packets and at least one of the plurality of packets comprises a payload portion and a separate header portion comprising the at least a portion of said image data, wherein said image data is a binary image file having a binary based format used to define transmission of encoded bitmap data;
wherein the header portion includes at least one parameter that controls the display of the at least a portion of the image data on the display during the ongoing packet transfer.

20. An apparatus according to claim 19 wherein the image data and the content are transmitted wirelessly.

21. The apparatus of claim 19, wherein said image data is a binary image file having a binary based format used to define transmission of encoded bitmap data drawn from the group consisting of JFIF, JPG, JPG2000, GIF, PNG, TIF, EXIF, AVI, and MP3 formatted images.

22. An apparatus, comprising:
a receiving device configured to receive, during an ongoing packet transfer operation in which packets of content are sent by a sending device, image data in addition to said content, at least a portion of said image data for display during said ongoing packet transfer, wherein said packet transfer comprises a plurality of packets and at least one of the plurality of packets comprises a payload portion and a separate header portion comprising the at least a portion of said image data, wherein said image data is a binary image file having a binary based format used to define transmission of encoded bitmap data; and
a display device configured to display said at least a portion of the image data on a display associated with said receiving device during said ongoing packet transfer;
wherein said header portion includes at least one parameter that controls the display of the at least a portion of the image data on the display device during the ongoing packet transfer.

23. An apparatus according to claim 22 wherein the at least a portion of the image data is received in the header portion of at least one of the packets associated with said ongoing packet transfer.

24. An apparatus according to claim 22 wherein the at least a portion of the image data is encapsulated into the header portion of at least one of the packets associated with the ongoing packet transfer.

25. An apparatus according to claim 22 wherein the at least a portion of the image data is displayed in lieu of the content during the ongoing packet transfer.

26. An apparatus according to claim 22 wherein the at least a portion of the image data and the content are received wirelessly.

27. A method, comprising:
embedding at least a portion of image data into at least one content packet associated with an ongoing data transfer operation in which packets of content are transferred between a sending device and a receiving device, wherein said at least one content packet comprises a header portion and said at least a portion of the image data is transmitted in the header portion, wherein said image data is a binary image file having a binary based format used to define transmission of encoded bitmap data; and
transmitting the at least one content packet associated with the ongoing data transfer operation including the at least a portion of the image data to the receiving device;
wherein the at least a portion of the image data enables the receiving device to display at least one graphical image corresponding to the at least a portion of the image data.

28. A system, comprising:
a sending device configured to embed at least a portion of picture data into at least one content packet associated with an ongoing data transfer operation in which packets of content are transferred between the sending device and a receiving device, and further configured to send, to the receiving device, the at least one content packet associated with the ongoing data transfer operation including the at least a portion of the picture data, wherein said at least one content packet comprises a header portion and a payload portion and said at least a portion of the picture data is transmitted in the header portion, wherein said picture data is a binary image file having a binary based format used to define transmission of encoded bitmap data;
a receiving device configured to receive, from the sending device, the at least one content packet associated with the ongoing data transfer operation including the at least a portion of the picture data; and
a display, associated with the receiving device, configured to display, at least one graphical image corresponding to the at least a portion of the picture data, while waiting for the ongoing data transfer operation to complete.

29. An apparatus, comprising:
a sending device configured to embed at least a portion of image data into at least one content packet associated with an ongoing data transfer operation in which packets of content are transferred between the sending device and a receiving device, wherein said at least one content packet comprises a header portion and a payload portion and said at least a portion of the image data is transmitted in the header portion, wherein said image data is a binary image file having a binary based format used to define transmission of encoded bitmap data; and
said sending device further configured to transmit the at least one content packet associated with the ongoing data transfer operation including the at least a portion of the image data to the receiving device;
wherein the at least a portion of the image data enables the receiving device to display, on a display associated with the receiving device, at least one graphical image corresponding to the at least a portion of the image data.

30. An apparatus, comprising:
a receiving device configured to receive at least a portion of image data embedded into at least one content packet associated with an ongoing data transfer operation in which packets of content are transferred between a sending device and the receiving device, wherein said at least one content packet comprises a header portion and said at least a portion of the image data is transmitted in the header portion, wherein said image data is a binary image file having a binary based format used to define transmission of encoded bitmap data;
wherein the at least one content packet contains both the at least a portion of the image data and content of the ongoing data transfer operation;

said receiving device further configured to remove the at least a portion of the image data from the at least one content packet during the ongoing data transfer operation; and said receiving device further configured to display, on a display associated with the receiving device, at least one graphical image corresponding to the at least a portion of the image data removed from the at least one content packet, during the ongoing data transfer operation.

31. An apparatus, comprising:

means for transmitting during an ongoing packet transfer operation in which a plurality of packets of content are sent to a receiving device, at least a portion of picture data in addition to said content, with the packets associated with said ongoing packet transfer for display on a display associated with the receiving device, while waiting for said ongoing packet transfer to complete, wherein at least one of the plurality of packets comprises a payload portion and a separate header portion comprising the at least a portion of said picture data, wherein said picture data is a binary image file having a binary based format used to define transmission of encoded bitmap data;

wherein the header portion includes at least one parameter that controls the display of the at least a portion of said picture data on the display associated with the receiving device during the ongoing packet transfer.

32. An apparatus, comprising:

means for receiving during an ongoing packet transfer operation in which a plurality of packets of content are sent by a sending device, at least a portion of picture data in addition to said content, with the packets associated with said ongoing packet transfer, wherein at least one of the plurality of packets comprises a payload portion and a separate header portion comprising the at least a portion of said picture data, wherein said picture data is a binary image file having a binary based format used to define transmission of encoded bitmap data; and means for displaying said at least a portion of the picture data associated with said means for receiving, while waiting for said ongoing packet transfer to complete;

wherein the header portion includes at least one parameter that controls the display of the at least a portion of said picture data on the means for displaying associated with the means for receiving during the ongoing packet transfer.

* * * * *